United States Patent
Kuboyama et al.

(10) Patent No.: US 8,675,041 B2
(45) Date of Patent: Mar. 18, 2014

(54) VEHICLE PERIPHERY MONITORING DEVICE

(75) Inventors: Tsuyoshi Kuboyama, Kariya (JP); Kazuya Watanabe, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 408 days.

(21) Appl. No.: 12/531,164

(22) PCT Filed: Jun. 12, 2008

(86) PCT No.: PCT/JP2008/060766
§ 371 (c)(1),
(2), (4) Date: Sep. 14, 2009

(87) PCT Pub. No.: WO2009/004907
PCT Pub. Date: Jan. 8, 2009

(65) Prior Publication Data
US 2010/0110189 A1     May 6, 2010

(30) Foreign Application Priority Data
Jul. 5, 2007   (JP) ................................ 2007-177671

(51) Int. Cl.
*H04N 7/00* (2011.01)
*H04N 7/18* (2006.01)

(52) U.S. Cl.
USPC .................. 348/36; 348/37; 348/38; 348/39; 348/148; 348/149

(58) Field of Classification Search
USPC ...................................... 348/36–39, 148–149
See application file for complete search history.

(56) References Cited

U.S. PATENT DOCUMENTS 5,384,588 A * 1/1995 Martin et al. ................. 348/14.1
(Continued)

FOREIGN PATENT DOCUMENTS

| JP | 06-282793 A | 10/1994 |
| JP | 10-271490 A | 10/1998 |

(Continued)

OTHER PUBLICATIONS

International Search Report of PCT/JP2008/060766 dated Jul. 29, 2008.

*Primary Examiner* — David Czekaj
*Assistant Examiner* — Chikaodili E Anyikire
(74) *Attorney, Agent, or Firm* — Sughrue Mion, PLLC

(57) ABSTRACT

An object is to provide a vehicle periphery monitoring device wherein distortions in a captured image containing an edge of the vehicle body can be corrected so that parallel perception is the same as in actual space, and wherein images readily discernible to the driver can be displayed. The edge of the vehicle body is included in the image captured by a camera provided to the vehicle. A Y-axis along the edge of the vehicle body and an X-axis orthogonal to the Y-axis are set in the captured image. Distortions are corrected so that the X-axis is enlarged at a magnification ratio γ that increases in a nonlinear fashion that depends of the distance from the X-axis while the Y-axis is kept substantially fixed. The captured image thus corrected for distortion is displayed on an onboard monitor.

8 Claims, 3 Drawing Sheets

(56) References Cited

U.S. PATENT DOCUMENTS

| | | | |
|---|---|---|---|
| 6,055,014 A * | 4/2000 | Hosonuma et al. | 348/143 |
| 6,201,574 B1 * | 3/2001 | Martin | 348/315 |
| 7,538,795 B2 * | 5/2009 | Shibatani et al. | 348/208.16 |
| 7,764,309 B2 * | 7/2010 | Deguchi | 348/218.1 |
| 2004/0042638 A1 * | 3/2004 | Iwano | 382/104 |
| 2004/0260469 A1 * | 12/2004 | Mizusawa | 701/300 |
| 2006/0132601 A1 | 6/2006 | Kukita et al. | |
| 2006/0209188 A1 * | 9/2006 | Mizusawa | 348/148 |
| 2006/0262193 A1 * | 11/2006 | Kumaki | 348/208.6 |
| 2008/0036857 A1 | 2/2008 | Shimazaki | |

FOREIGN PATENT DOCUMENTS

| | | |
|---|---|---|
| JP | 2000-135949 A | 5/2000 |
| JP | 2003-212041 A | 7/2003 |
| JP | 2004-021307 A | 1/2004 |
| JP | 2004-159186 A | 6/2004 |
| JP | 2004-194071 A | 7/2004 |
| JP | 2005-020502 A | 1/2005 |
| JP | 2005-217889 A | 8/2005 |
| JP | 2006-127383 A | 5/2006 |
| JP | 2006-165946 A | 6/2006 |

* cited by examiner

VEHICLE PERIPHERY MONITORING DEVICE

TECHNICAL FIELD

The present invention relates to a vehicle periphery monitoring device for performing predetermined image processing on an image captured by a camera provided to the vehicle, and displaying the image on an onboard display device.

BACKGROUND ART

A drive assistance picture generator disclosed in Patent Document 1, for example, is known as a technique for performing predetermined image processing to facilitate a driver's view when an image captured by a camera provided to a vehicle is displayed on an onboard display device. This drive assistance picture generator divides the monitor screen into two parts, and, on the one hand, removes lens distortion from the image captured by the side camera to display the corrected image so that straight lines are displayed as straight lines. On the other hand, the generator displays the images that have been converted so as to appear as images from a virtual camera disposed in the air above the side mirror. The pictures are displayed to provide readily discernable images to the driver when the vehicle is moving to the side.

Patent Document 2 describes an onboard imaging system for monitoring that can capture a wide view of an area around the vehicle body using a single lens group, and that can provide, in a simple manner, accurate and sufficient information to the driver on the basis of the image. This onboard imaging system for monitoring is provided with distortion correction means for correcting distortion of image information and is adapted to produce undistorted planar image information using the correction means so that the driver can immediately perceive the depth and determine the size and other factors of objects.

Patent Document 1: Japanese Laid-open Patent Application No. 2004-194071

Patent Document 2: Japanese Laid-open Patent Application No. 2004-159186

DISCLOSURE OF THE INVENTION

The image captured by a wide-angle fisheye camera or the like provided to the vehicle is a severely distorted image that appears to be severely distorted when displayed unmodified on an onboard monitor, and is therefore subjected to the distortion correction described above. Neither of the documents noted above disclose a specific method for carrying out the distortion correction. However, when the image captured by the wide-angle fisheye camera or the like provided to the vehicle is to be corrected for distortion, it is desirable as much as possible to correct the distortion so that the edges of the vehicle body in actual space, as well as straight lines parallel to the edge of the vehicle body, are displayed in an unchanged parallel relationship in order to counter situations in which the vehicle moves to the side or the like.

The present invention was contrived in view of the foregoing problems, and an object thereof is to provide a vehicle periphery monitoring device wherein distortions in a captured image containing the edges of the vehicle body can be corrected so that parallel perception is the same as in actual space, and wherein images readily discernible to the driver can be displayed.

In order to solve the above-described problems, the vehicle periphery monitoring device of the present invention subjects an image captured by a camera provided to a vehicle to predetermined image processing, and displays the image on an onboard display device, the vehicle periphery monitoring device comprising a coordinate axes setting unit for setting a first axis along an edge of the vehicle body in the captured image, and a second axis orthogonal to the first axis, the camera being disposed so as to include the edge of the vehicle body in the captured image; and a distortion correction processor for enlarging the captured image at a magnification ratio that increases in the second axis direction in a nonlinear fashion that depends on the distance from the second axis while the first axis direction is kept substantially fixed, wherein the captured image corrected for distortion is displayed on the display device.

In accordance with this configuration, the first axis along the edge of the vehicle body in the captured image, and the second axis orthogonal to the first axis are first set, and distortions are corrected by enlarging the captured image at a magnification ratio that increases in the second axis direction in a nonlinear fashion that depends on the distance from the second axis while the first axis direction is kept substantially fixed.

For example, the first axis is set along the edge and inside the arcuate edge in the case that the edge of an arcuate vehicle body has a relatively small curvature in the captured image. Next, the second axis orthogonal to the first axis is set so as to pass through a center area of the arcuate edge. At this point, the center area of the arcuate edge is farthest from the first axis and approaches the first axis in progress toward the edge, in other words, approaches the first axis when moving away from the second axis.

Therefore, the arcuate edge can be made into a straight line by enlarging in the second axis direction using a magnification ratio that increases in progress away from the second axis, i.e., as the distance from the second axis increases. A nonlinear ratio is used as the magnification ratio because the edge is curved.

The captured image can be displayed with the same parallel perception as in actual space because this distortion correction process can form a straight line from the edge of the vehicle body or another curved line in the captured image. The captured image following distortion correction is therefore easier to view for the driver, and the state of the periphery of the vehicle can be more readily ascertained.

In a preferred embodiment of the vehicle periphery monitoring device of the present invention, the coordinate axes setting unit sets the first axis and the second axis using the imaging center of the camera as the origin. In accordance with this configuration, distortion of the image as such on the first axis in the captured image is low and distortions can be more effectively corrected because the imaging center of the camera is used as the origin.

A side camera, a rear camera, or the like can be used as the camera, but in a preferred embodiment of the vehicle periphery monitoring device of the present invention, the camera is a side camera and the imaging direction of the side camera is set facing perpendicularly downward. In accordance with this configuration, the side camera is set so that the direction of the captured image (the direction of the optical axis of the lens) is set facing perpendicularly downward, and the first axis and the second axis are set using the imaging center as the origin, which is the position of the optical axis center in the captured image. The image captured in this case is the side part of the vehicle body, and the first axis is set along this side part. As described above, information of the forward/rearward direction of the vehicle can be retained even when distortion correction is carried out in this case because the first axis direction remains substantially fixed during distortion correction in the present invention. This is preferred because, in particular, the field of view in the forward direction of the vehicle can be assured.

In a preferred embodiment of the vehicle periphery monitoring device of the present invention, the camera is a rear camera. A rear captured image can thereby be displayed as an image that has the same feel as direct viewing, and is therefore an image that is easily viewed by the driver.

BEST MODE FOR CARRYING OUT THE INVENTION

An embodiment of the vehicle periphery monitoring device according to the present invention is described below with reference to the drawings.

[Overall Configuration]

Figure 1:
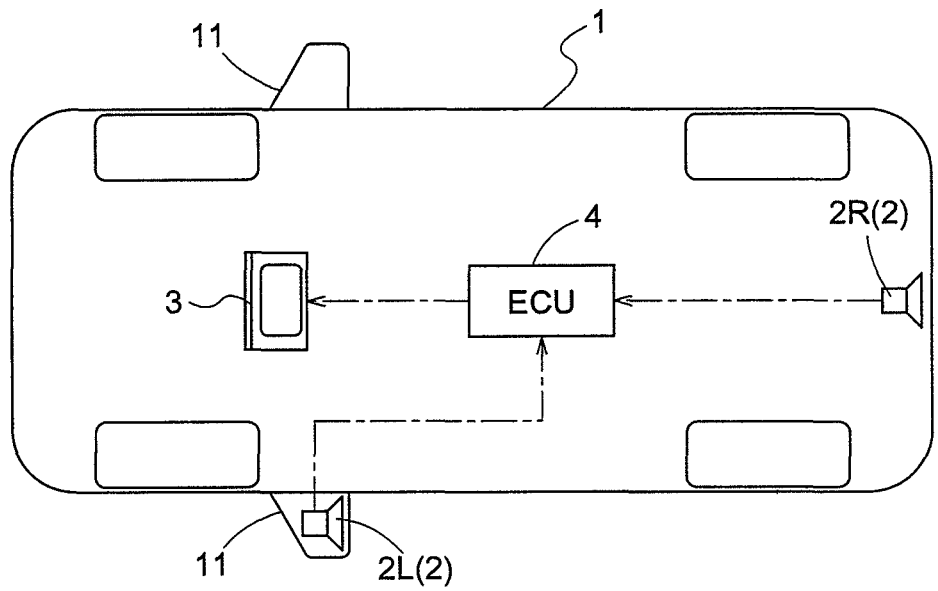
FIG. 1 is a schematic view showing the overall configuration of the vehicle in the present embodiment.

FIG. 1 schematically shows a vehicle in which the vehicle periphery monitoring device has been mounted. A side camera 2L is mounted on the side mirror 11 of the passenger side of the vehicle 1, and a rear camera 2R is provided to the rear of the vehicle 1. Information of the image captured by these cameras 2 (generally referring to the side camera 2L and the rear camera 2R, and the same applies hereinbelow) is transmitted to the image-processing ECU 4, subjected to predetermined image processing, and then displayed on the display unit 3. The side camera 2L is a wide-angle fisheye camera disposed so that the imaging direction (the optical axis direction of the lens) is facing perpendicularly downward, and is disposed so that the left-side edge of the vehicle body is captured in the captured image (see FIG. 5(a)). The rear camera 2R is a wide-angle fisheye camera disposed so that the imaging direction faces diagonally downward, and is disposed so that the bumper is captured in the captured image (see FIG. 6(a)).

[Image-Processing ECU]

Figure 2:
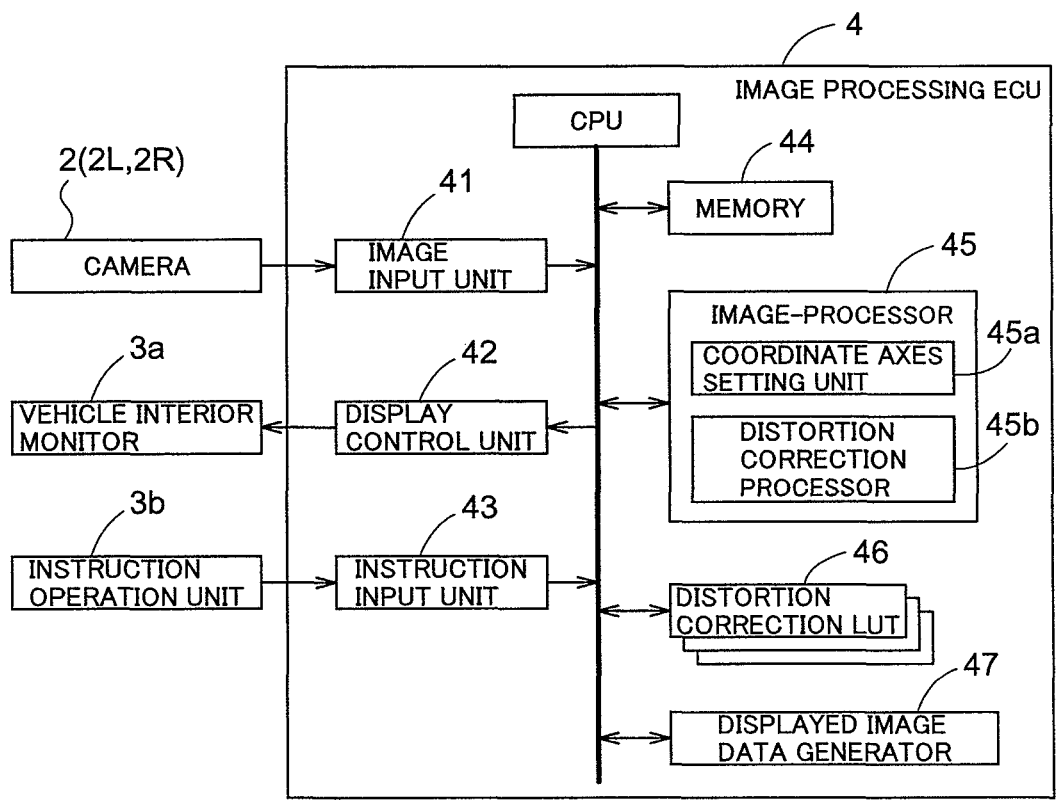
FIG. 2 is a functional block view of the image-processing ECU.

FIG. 2 is a functional block diagram showing the functional parts particularly related to the present invention as pertains to an image-processing ECU 4 mounted in a vehicle 1. These functional parts have a CPU as the core member and are configured from hardware or software or both. The image (more precisely captured image data, but hereinbelow simply referred to as "captured image") captured by the cameras 2 is captured by an image input unit 41 and mapped out in memory 44. The captured image mapped out in the memory 44 is enlarged or reduced, rotated, corrected for distortion, and subjected to other predetermined image processes carried out by the an image-processor 45. The image data for display is generated by a displayed image data generator 47 using the image-processed captured image, and is displayed on the onboard monitor 3a of the display unit 3 via a display control unit 42. An instruction operation unit 3b is also provided to the display unit 3 in the form of a touch panel provided to the onboard monitor 3a, in the form of buttons in the vicinity of the onboard monitor 3a, or the like, and information from the instruction operation unit 3b is received by an instruction input unit 43.

Next, the distortion correction processing particularly related to the present invention as one type of image processing carried out by the image-processor 45 will be described. A distortion correction processor 45b for correcting distortions with reference to a coordinate axes setting unit 45a and a distortion correction LUT 46 is provided to the image-processor 45 in order to correct the distortions.

The coordinate axes setting unit 45a sets the first axis along the edge of the vehicle body shown in the captured image, and sets the second axis orthogonal to the first axis in the image captured by the cameras 2. For example, in the case of the captured image obtained by the side camera 2L, the Y-axis as the first axis is set inside the curved edge because the edge of the left side of the vehicle body is curved in the manner shown in FIG. 5(a). The X-axis orthogonal to the Y-axis is set so as to pass through the center area of the edge of the left side of the vehicle body. Similarly, in the case of a captured image obtained by the rear camera 2R, the Y-axis as the first axis is set inside the curved bumper because the bumper is curved in the manner shown in FIG. 6(a). The X-axis orthogonal to the Y-axis is set so as to pass through the center area of the bumper.

In the present embodiment, the coordinate axes are initially set so that the vertical direction and the lateral direction of the captured image is the Y-axis or the X-axis using the captured image center (optical axis position) as the origin. However, the position of the origin, the inclination of the coordinate axes in relation to the vertical and lateral directions, and other factors can be modified as the driver desires using the instruction operation unit 3b.

Figure 3:
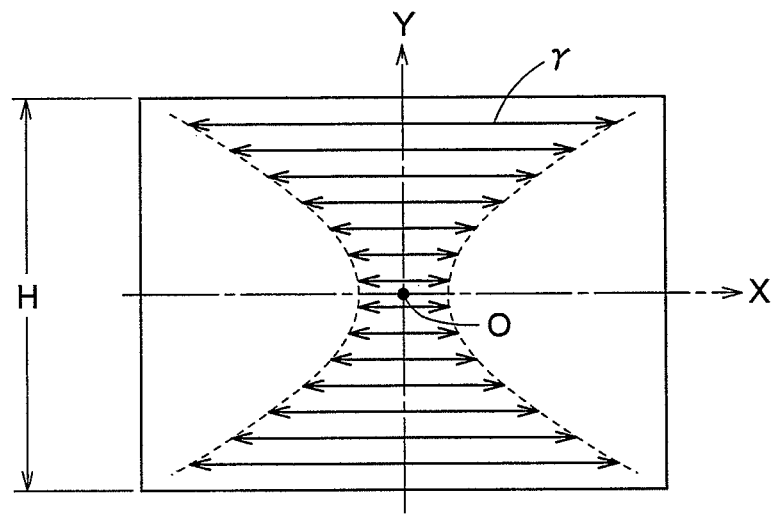
FIG. 3 is a descriptive diagram of the magnification ratio in the distortion correction process.

The distortion correction processor 45b enlarges the captured image in which the coordinate axes have been set. The enlargement is performed using a magnification ratio at which the second axis (X-axis) direction is increased in a nonlinear fashion that depends on the distance from the second axis (X-axis) while the first axis (Y-axis) direction is kept substantially fixed. Such a magnification ratio is conceptually shown in FIG. 3. The Y-axis direction in FIG. 3 is fixed, and the X-axis direction is enlarged by a magnification ratio γ. The magnification ratio γ increases away from the X-axis, i.e., increases as the magnitude of Y (the absolute value of Y) increases, and the magnification ratio γ is shown in FIG. 3 to increase in the upward direction or in the downward direction. In other words, when the value of Y is positive, the value increases in the X-axis direction at a larger magnification ratio in correlation with a larger value, and when the value of Y is negative, the value increases in the X-axis direction at a larger magnification ratio in correlation with a smaller value. As used herein, the X-axis direction is the positive and negative directions of the X-axis, and the Y-axis direction is the positive and negative directions of the Y-axis. Thus, the term "X-axis direction" or "Y-axis direction" is merely used in the case that there is no need to distinguish between the positive and negative directions.

Various processes may be used as such conversion processes, and the following is provided as an example of conversion formulas in the case that the coordinate axes have been set using the captured image center as the origin.

$$X' = \gamma * X = [1 + a * \{Y/(H/2)\}^2] * X \tag{1}$$

$$Y' = Y \tag{2}$$

In the formula, (X, Y) is the coordinate prior to conversion, (X', Y') is the coordinate after conversion, H is the length in the vertical direction (Y-axis direction) of the captured image, and "a" is an adjustment coefficient. The * symbol refers to multiplication, the/symbol refers to division, and the ^ symbol refers to the power of a number. The adjustment coefficient "a" is an experimentally, or empirically, obtained value. The computational load can be reduced by using such a simple formula, and since the entire captured image is converted using a single formula, the entire image can be corrected in a continuous fashion.

In accordance with formulas (1) and (2), the X-axis direction is enlarged by a magnification ratio γ while the Y-axis direction remains fixed. The magnification ratio γ increases in a nonlinear fashion that depends on the distance from the X-axis, i.e., the magnitude of Y. It is apparent from formula (I) that the magnification ratio γ is defined to be the value obtained by normalizing the Y-axis direction using Y/(H/2), squaring the value of the normalized Y-axis direction, multiplying the squared value by the adjustment coefficient a, and incrementing the multiplication product by 1.

Such formulas are not limited to formulas (1), (2) described above, and may, of course, use other modes such as natural numbers having a power of 2 or more. It is also possible to carry out computations in each case on the basis of a conversion formula. In the present embodiment, the data group related to the conversion is stored in the distortion correction LUT 46 in the form of a lookup table. A plurality of conversion tables may be prepared as needed for the inclination of the coordinate axes related to the position of the origin and the vertical and lateral directions.

Thus, the distortion correction processor 45*b* corrects the captured image, for which the coordinate axes have been set by the coordinate axes setting unit 45*a*, for distortion by carrying out the conversion processing described above with reference to the distortion correction LUT 46. In other words, a pixel in the coordinate position (X, Y) is converted to the coordinate position (X', Y'), and the results are interpolated to supplement missing pixels by such a conversion.

[Displaying a Captured Image]

Figure 4:
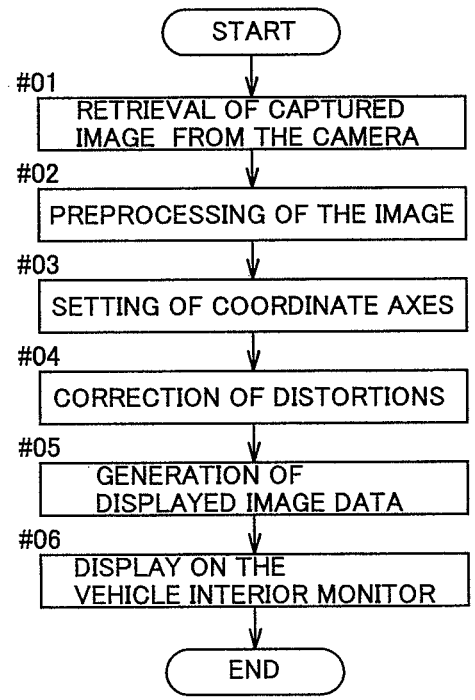
FIG. 4 is a flowchart of the distortion correction process.

Next, the flow of the process for displaying a captured image according to the present embodiment will be described with reference to FIG. 4. First, the image input unit 41 captures the image from the cameras 2, and maps the captured image in the memory 44 (#01). The image-processor 45 enlarges, reduces, rotates, clips, or subjects the captured image to other preprocessing (#02). For example, in the case that the vehicle body occupies a high percentage of the captured image, it is possible to use a clipping process to clip away a rectangular region that includes the edge of the vehicle body and the road portion around the periphery of the vehicle body.

Next, the coordinate axes setting unit 45*a* sets the Y-axis and the X-axis described above on the captured image (#03). In the present embodiment, the imaging center (optical axis position) is initially set to be the origin, but the position of the origin and the inclination of the coordinate axes can be adjusted by the instruction operation unit 3*b*. The distortion correction processor 45*b* corrects distortion in the captured image in which the coordinate axes have been set (#04). The data for converting the coordinates on the captured image in the distortion correction processing are stored in the distortion correction LUT 46, and the distortion correction processor 45*b* corrects distortions by referencing the distortion correction LUT 46.

The captured image to be displayed on the onboard monitor 3*a* is generated (#05) by the displayed image data generator 47 from the captured image corrected for distortion by the distortion correction processor 45*b*, and is displayed on the onboard monitor 3*a* via the display control unit 42 (#06).

[Captured Image Corrected for Distortion]

Figure 5:
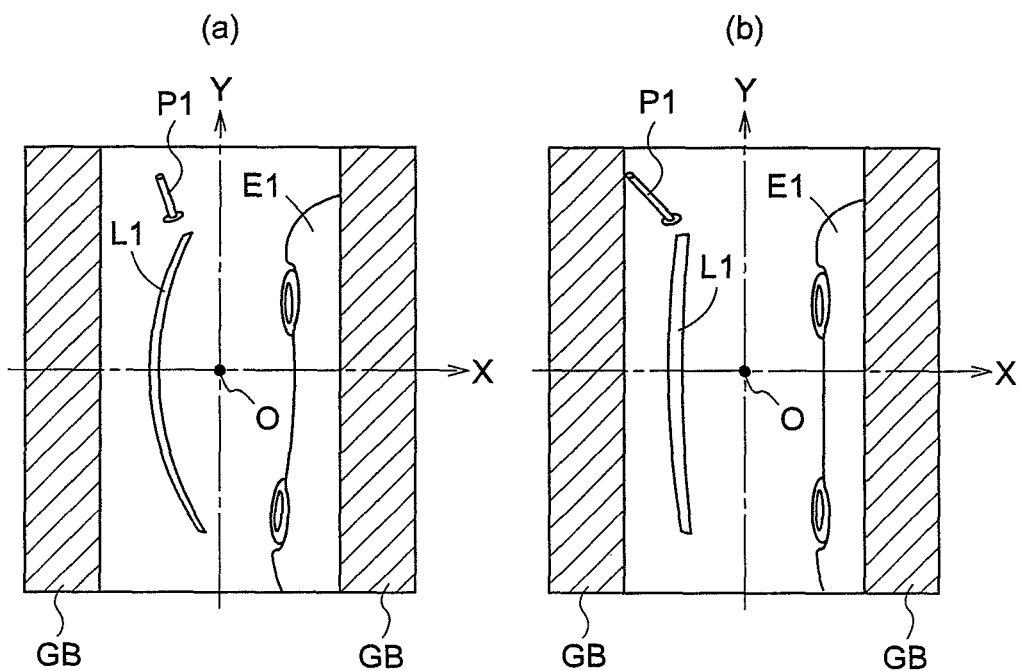
FIG. 5 is a diagram showing an example of the distortion correction process for an image captured by the side mirror.
Figure 6:
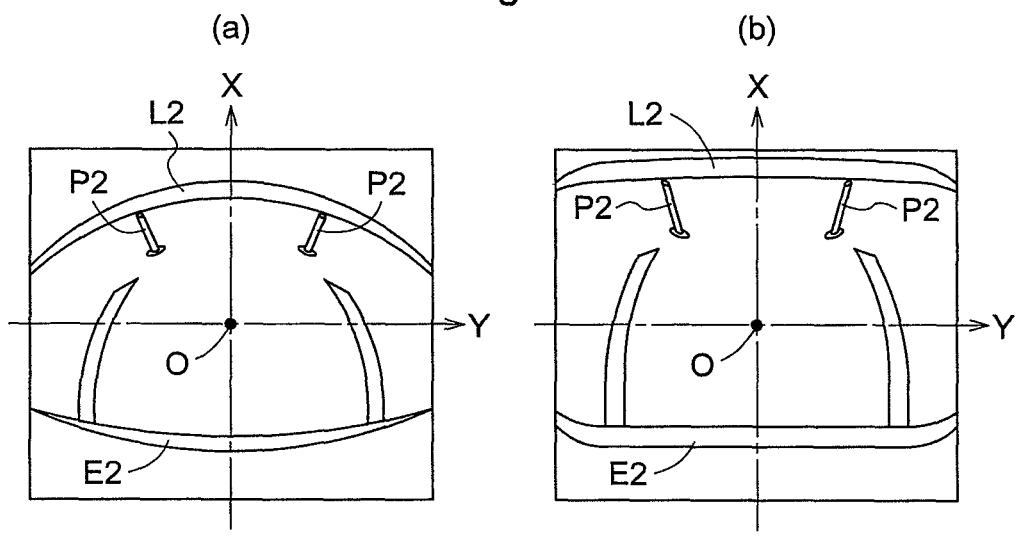
FIG. 6 is a diagram showing an example of the distortion correction process for an image captured by the rear mirror.

An example of the captured image displayed by distortion correction processing is shown in FIGS. 5 and 6. FIG. 5(*a*) shows an image captured by the side camera 2L before distortions have been corrected. The side camera 2L is a wide-angle fisheye camera as described above, and the area from the front end of the vehicle body to the rear end is therefore shown in the captured image. The original image is clipped, and when the aspect ratio of the clipped image and the aspect ratio of the onboard monitor 3*a* do not match during display, a portion of the onboard monitor 3*a* is a background image GB, as shown in the drawings. The aspect ratio may be intentionally changed when the background images on the screen become excessive. Before distortions are corrected, the edge E1 of the left side of the vehicle body is curved in the leftward direction, and the line L1 on the road surface of the left side of the vehicle is curved in the rightward direction. The edge E1 of the left side of the vehicle body and the line L1 are substantially parallel in actual space.

In view of the above, in order to correct distortions as described above, the imaging center (optical axis position) O of the side camera 2L is used as the origin, the Y-axis is set in the vertical direction of the captured image along the edge E1 of the left side of the vehicle body, and the X-axis is set in the lateral direction orthogonal to the Y-axis. The captured image in which the coordinate axes have been set in the manner described above is corrected for distortion. Specifically, the (X, Y) position in the captured image is converted to the (X', Y') position using formulas (1) and (2) described above, and the captured image is enlarged in the X-axis direction.

Conversion based on formula (1) as described above involves increasing the magnification ratio γ so that the ratio increases in a nonlinear fashion that depends on the magnitude of Y (the absolute value of Y) in the X-axis direction while the Y-axis direction is kept fixed. In other words, the captured image is enlarged in the X-axis direction in a larger magnification ratio γ as the value of Y increases in the positive direction of the Y-axis, and the captured image is enlarged in the X-axis direction in a larger magnification ratio γ as the value of Y decreases in the negative direction of the Y-axis, as shown in FIG. 3. The edge E1 of the left side of the vehicle body and the line L1 have shapes in the captured image not yet corrected for distortion that approach the Y-axis in the positive or negative direction of the Y-axis. Therefore, the edge E1 of the left side of the vehicle body and the line L1 can be made substantially parallel, as shown in FIG. 5(*b*), by correcting the distortions. The pole P1 on the road surface also becomes more erect with respect to the line L1 in similarity with actual space.

FIG. 6(*a*) shows an image captured by the rear camera 2R before distortions have been corrected. The bumper E2 is curved upward, and the line L2 on the road surface rearward of the vehicle is curved downward before distortions have been corrected. In actual space, the bumper E2 and the line L2 are substantially parallel.

In the case of the rear camera 2R, the Y-axis is set in the lateral direction along the bumper, and the X-axis is set in the vertical direction so as to be orthogonal to the Y-axis because the bumper E2 extends in the lateral direction of the captured image. In this case as well, the origin O is the imaging center. Distortions are corrected in the same manner as described above, whereby the bumper E2 and the rearward line L2 can be made substantially parallel, as shown in FIG. 6(b). The pole P2 on the road surface can also be made more erect in similarity with actual space.

Such a correction of distortions allows the image captured by the cameras 2 to be displayed on the onboard monitor 3a as an image that has the same feel as direct viewing. Therefore, the image can be easily viewed by the driver, and the peripheral state of the vehicle can be readily grasped. Also, since the Y-axis direction does not undergo conversion, there is an advantage in that the field of view in the forward direction of the vehicle can be assured in the case of a side camera.

[Another Embodiment]

In the embodiment described above, the X-axis or the Y-axis is set in the vertical direction or the lateral direction of the captured image, but the axis may also be set so as to be inclined at a predetermined angle from the vertical direction or the lateral direction as long as the Y-axis follows the edge of the vehicle body. The edge of the vehicle body to which the Y-axis is set is the portion of the edge of the vehicle body shown in the captured image that is to be made parallel, and is often the edge of the vehicle body that has the smallest curvature and the greatest length in the captured image. An example of the method for setting the Y-axis along the edge of the vehicle is one in which the Y-axis is set to be substantially parallel to the tangent in the center vicinity (center or near the center) of the edge of the target vehicle.

In the embodiment described above, the origin of the X-axis and the Y-axis is set to be the imaging center (optical axis position), but no limitation is imposed thereby and the origin can also be set in the vicinity of the imaging center or in another position. The Y-axis is set along the edge of the vehicle and inside the edge of a curved vehicle, in particular due to the nature of the magnification ratio in the correction of distortions according to the present invention. It is advantageous to set the X-axis so as to pass through the vicinity of a position farthest away from the Y-axis in the edge of the curved vehicle.

In the embodiment described above, the conversion process is carried out using a single conversion formula for the entire screen of a captured image when distortions are corrected, but the conversion process may also be carried out by dividing the captured image into a plurality of regions using different conversion formulas for each region, and combining the regions together. For example, the enlargement process may be carried out using different magnification ratios in the positive and negative directions of the X-axis.

Also possible is a mode in which the edge (profile) of the vehicle is detected from the captured image, and the coordinate axes are automatically set in relation to the detected edge. In other words, a vehicle body edge detection unit may be provided, and this vehicle body edge extraction unit may detect the edge by a known method from the image captured by the cameras 2, and extract an edge that corresponds to the edge of the vehicle body from the edge image. The edge of the vehicle body can be extracted based on camera information transmitted to the vehicle body edge detection unit, such as the imaging direction and the setting position of the camera. The case in which the image captured by the side camera 2L will be described as a simple example. A continuous curve in the vertical direction and nearest to the right side of the captured image can be extracted as the edge of the vehicle body because the vehicle body is shown in the right side of the captured image, as shown in FIG. 5(a). Since the coordinate axes are set along the edge of the vehicle body extracted in this manner, the axes can be readily set even when the position of the edge of the vehicle in the captured image has changed due to the opening, closing, etc. of the mirror to which the side camera has been provided.

In the case that a vehicle body edge detection unit is provided, it is also possible to use a configuration in which an approximated curve of the edge that corresponds to the extracted edge of the vehicle body is obtained, a conversion formula is computed that makes the approximated curve to be substantially parallel to the Y-axis while being kept substantially fixed in the Y-axis direction, and the magnification ratio is derived in order to correct the captured image for distortion on the basis of the conversion formula. Accordingly, a vehicle body edge detection unit and a magnification ratio calculation unit are provided, the approximated curve of the edge of the vehicle body is obtained in the magnification ratio calculation unit, and the conversion formula is calculated from the approximated curve of the edge of the vehicle body thus calculated in order to make the approximated curve substantially parallel to the Y-axis. The magnification ratio for correcting distortions is calculated from the conversion formula thus calculated. In this case, a distortion correction LUT generator for generating a distortion correction LUT may be provided in order to correct distortions using the calculated magnification ratio. This configuration is advantageous in that a suitable magnification ratio is automatically set in accordance with conditions.

INDUSTRIAL APPLICABILITY

The present invention can be used as a vehicle periphery monitoring device whereby an image captured by a camera provided to the vehicle is processed in a predetermined manner, and displaying the image on an onboard display device.

The invention claimed is:

1. A vehicle periphery monitoring device for subjecting an image captured by a camera provided to a vehicle to predetermined image processing, and displaying the image on an onboard display device, the vehicle periphery monitoring device comprising:
a coordinate axes setting unit for setting a first axis along an edge of the vehicle body in the captured image, and a second axis orthogonal to the first axis, the camera being disposed so as to include the edge of the vehicle body in the captured image; and
a distortion correction processor for enlarging the captured image at a magnification ratio that increases in the second axis direction in a nonlinear fashion that depends on the distance from the second axis while a magnification ratio in the first axis direction is kept substantially fixed, wherein
the captured image corrected for distortion is displayed on the display device;
the first axis direction is a vertical direction of the captured image, and the second axis direction is a lateral direction of the captured image.

2. The vehicle periphery monitoring device according to claim 1, wherein the coordinate axes setting unit sets the first axis and the second axis using the imaging center of the camera as the origin.

3. The vehicle periphery monitoring device according to claim 1, wherein the camera is a side camera, and the imaging direction of the side camera is set facing perpendicularly downward.

4. The vehicle periphery monitoring device according to claim 1, wherein the camera is a rear camera.

5. The vehicle periphery monitoring device according to claim 2, wherein the camera is a side camera, and the imaging direction of the side camera is set facing perpendicularly downward.

6. The vehicle periphery monitoring device according to claim 2, wherein the camera is a rear camera.

7. The vehicle periphery monitoring device according to claim 1, wherein the magnification ratio in the first axis direction is kept fixed.

8. A vehicle periphery monitoring device for subjecting an image captured by a camera provided to a vehicle to predetermined image processing, and displaying the image on an onboard display device, the vehicle periphery monitoring device comprising:
- a coordinate axes setting unit for setting a first axis extending in a front-rear direction of the vehicle body in the captured image, and a second axis orthogonal to the first axis, the camera being disposed so as to include the edge of the vehicle body in the captured image; and
- a distortion correction processor for enlarging the captured image at a magnification ratio that increases in the second axis direction in a nonlinear fashion that depends on the distance from the second axis while a magnification ratio in the first axis direction is kept substantially fixed, wherein
- the captured image corrected for distortion is displayed on the display device the first axis direction is a vertical direction of the captured image, and the second axis direction is a lateral direction of the captured image.

* * * * *